United States Patent
Zappi et al.

(10) Patent No.: US 10,947,144 B2
(45) Date of Patent: Mar. 16, 2021

(54) BIOREFINERY METHOD AND SYSTEM FOR ISOLATED ENVIRONMENTS

(71) Applicant: University of Louisiana at Lafayette, Lafayette, LA (US)

(72) Inventors: Mark E. Zappi, Lafayette, LA (US); Daniel Gang, Lafayette, LA (US); Emmanuel Revellame, Lafayette, LA (US); Andrei Chistoserdov, Lafayette, LA (US); Rafael Hernandez, Lafayette, LA (US); Rakesh Bajpai, Lafayette, LA (US); Wayne Sharp, Lafayette, LA (US); Dhan Fortela, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 16/600,619

(22) Filed: Oct. 14, 2019

(65) Prior Publication Data
US 2020/0048130 A1    Feb. 13, 2020

Related U.S. Application Data

(63) Continuation of application No. 15/828,809, filed on Dec. 1, 2017, now Pat. No. 10,479,716.
(Continued)

(51) Int. Cl.
*C02F 9/00* (2006.01)
*B01J 20/02* (2006.01)
(Continued)

(52) U.S. Cl.
CPC ............... *C02F 9/00* (2013.01); *B01J 20/027* (2013.01); *B01J 20/0207* (2013.01); *B01J 20/0233* (2013.01); *C02F 1/281* (2013.01); *C02F 1/32* (2013.01); *C02F 3/30* (2013.01); *C02F 2103/44* (2013.01); *C02F 2203/008* (2013.01); *C02F 2303/10* (2013.01); *Y02C 20/40* (2020.08); *Y02W 10/30* (2015.05); *Y02W 10/37* (2015.05)

(58) Field of Classification Search
CPC ...... C02F 9/00; C02F 3/30; C02F 1/32; C02F 1/281; C02F 2303/10; C02F 2103/44; C02F 2203/008; B01J 20/0233; B01J 20/027; B01J 20/0207; Y02W 10/37; Y02W 10/30; Y02C 10/08
USPC ........... 210/602, 603, 623, 631, 748.11, 903, 210/906, 911, 912
See application file for complete search history.

(56) References Cited

U.S. PATENT DOCUMENTS 9,868,964 B2 * 1/2018 Josse ..................... C02F 11/04
2009/0062581 A1 * 3/2009 Appel ..................... B09B 3/00
                                                                   585/241
(Continued)

*Primary Examiner* — Fred Prince
(74) *Attorney, Agent, or Firm* — Russel O. Primeaux; Lauren J. Rucinski; Kean Miller LLP

(57) ABSTRACT

A Biorefinery System (BIOSYS) that effectively treats all human activity-derived waste (black water, grey water, and food waste streams) using biological systems and that produces as process by-products: recovered potable water, liberated free oxygen, edible protein cake (with and without lipids), soil amendments, and machinery lube oils. Additionally, the system captures and chemically binds carbon dioxide into microbial cells and associated by-products, thus producing recovered usable returned cabin air.

8 Claims, 2 Drawing Sheets

Related U.S. Application Data

(60) Provisional application No. 62/428,693, filed on Dec. 1, 2016.

(51) Int. Cl.
    *C02F 3/30*     (2006.01)
    *C02F 1/32*     (2006.01)
    *C02F 1/28*     (2006.01)
    *C02F 103/44*     (2006.01)

(56) References Cited

U.S. PATENT DOCUMENTS

| | | | | |
|---|---|---|---|---|
| 2010/0264079 A1* | 10/2010 | Begin | ............... | C05F 11/00 |
| | | | | 210/603 |
| 2012/0159839 A1* | 6/2012 | Koskinen | ............... | C12N 9/248 |
| | | | | 44/307 |
| 2013/0123469 A1* | 5/2013 | Kumar | ............... | C12P 7/62 |
| | | | | 530/370 |
| 2015/0353982 A1* | 12/2015 | Van Alstyne | ............... | C12M 29/00 |
| | | | | 435/34 |
| 2016/0355546 A1* | 12/2016 | Ghorbani | ............... | C11B 3/001 |
| 2017/0055545 A1* | 3/2017 | Lee | ............... | A61K 36/064 |

\* cited by examiner

BIOREFINERY METHOD AND SYSTEM FOR ISOLATED ENVIRONMENTS

CROSS REFERENCE TO RELATED APPLICATIONS

This application claims priority to U.S. application Ser. No. 15/828,809 entitled "Biorefinery Method and System for Isolate Environments", filed Dec. 1, 2017, which claims priority to U.S. Provisional Application No. 62/428,693 entitled "Space-Based Biochemical Conversion System," filed Dec. 1, 2016.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Biorefinery Method and System for Isolated Environments, which may be embodied in various forms. It is to be understood that in some instances, various aspects of the invention may be shown exaggerated or enlarged to facilitate an understanding of the invention. Therefore, the drawings may not be to scale.

BACKGROUND

The 21st century has piloted dramatic shifts in the space industry. Governmental space programs and private industry is leading the way towards life among the cosmos. Astronauts spend months on the International Space Station orbiting the earth. Colonies on the Moon and Mars are no longer science fiction and will soon be commonplace.

For current and future space residents, water and oxygen are scarce, irreplaceable commodities. Based on current scientific knowledge, water and oxygen cannot be produced in the geochemical and atmospheric systems of other celestial bodies. Therefore, to sustain human life outside of Earth's atmosphere, recovery of carbon, oxygen, hydrogen, and associated microchemicals is needed to reduce the frequency of expensive make-up deliveries of these life-supporting chemicals. Consequently, these two key resources must be conserved and recycled as much as possible.

Similarly, conservation and re-use of vital elements is important to human-inhabited underground (sub-terrain safety bunkers, storage facilities, etc.) and subsea (e.g., submarines) systems. In fact, any isolated environment meant to support human life requires conservation of carbon, oxygen, hydrogen, etc.

Equally as problematic is the generation of waste in these isolated environments. Key waste streams include (1) Black Water (toilet-derived: feces, urine, associated paper, and water); (2) Food Wastes (kitchen and cafeteria derived with some water generation); and, (3) Grey Water (hygiene water: primarily water, with some soap and solids, generated from sinks and showers).

Gathering waste and dwindling life line resources inhibit human ability to live among the cosmos as well as in other isolated environments. The technology used to recover these resources must operate as a compact, low weight design with minimal energy and oxygen consumption ("footprints"). The systems must be low maintenance and simple to operate while maintain high efficiency, recovering a relatively high percentage of the life support resource chemicals for recycle. The ideal system will also be flexible and contain built in failsafe mechanisms that can adjust as events occur yet maintain operational capacity. No such system exists thus far.

To combat the lack of efficient and effective conversion systems, a Biorefinery System ("BIOSYS") and method is described herein that effectively treats all human activity-derived waste (black water, grey water, and food waste streams) using biological systems and produces useful process products.

Figure 1:
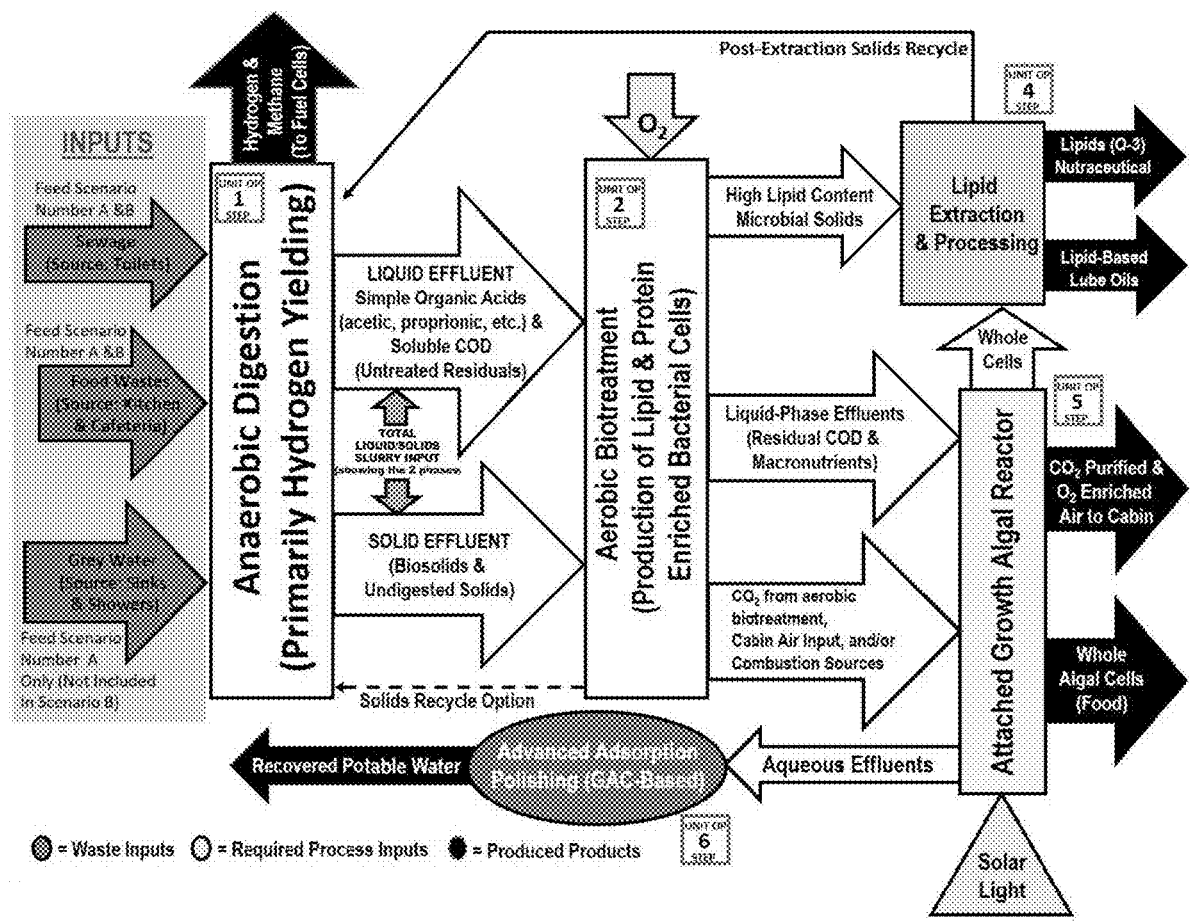
FIG. 1 is a flow diagram of an embodiment of the Biorefinery Method and System for Isolated Environments that includes an aerobic biotreatment step.

In one exemplary embodiment, depicted in the flow chart of FIG. 1, an aerobic biotreatment step, among other unit processes, produces lipid-enriched biomass. This embodiment requires a form of oxygen input but results in the treatment of the chemical oxygen demand ("COD") within the water influents to essentially zero concentrations. That is, almost all of the COD is converted to value-added chemicals, except for a small residual to be captured on the granular activated carbon ("GAC") polishing stage. A series of other products are also produced, comprising: (1) hydrogen, (2) methane, (3) Recovered Air (containing low $CO_2$ levels) to be recycled back into the cabin environment, (4) Lipids, (5) Protein Cake (with and without lipids), (6) Soil Amendments, and, (7) Recovered Water to be reused again as potable water.

Figure 2:
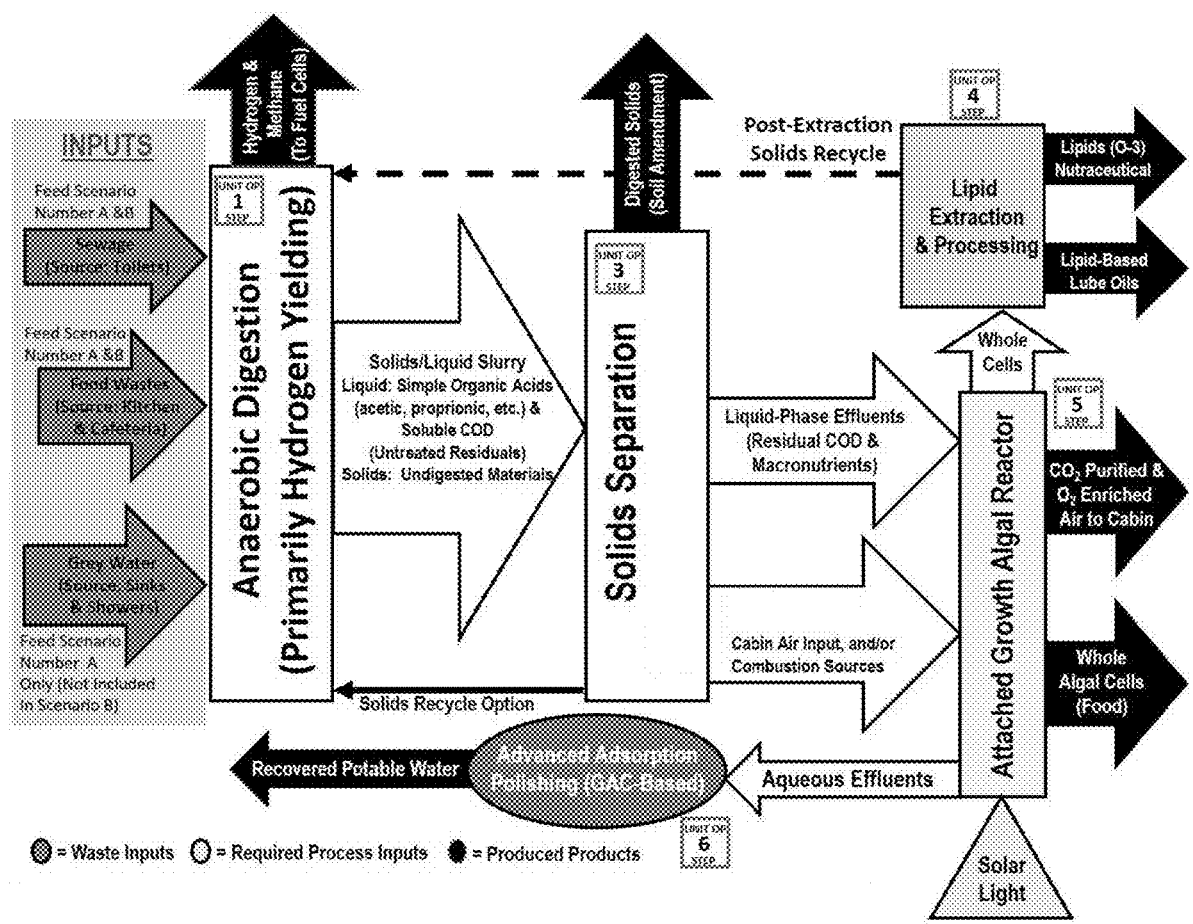
FIG. 2 is a flow diagram of an embodiment of the Biorefinery Method and System for Isolated Environments that excludes the aerobic biotreatment system to conserve oxygen use and uses a solid-liquid separator.

To reduce the energy, oxygen, and physical footprint of the BIOSYS, FIG. 2 depicts an embodiment of the invention that eliminates the aerobic step. This embodiment eliminates the need for any oxygen input at the expense of extent of lipid mass production. This embodiment also reduces system complexity.

With all embodiments, recovered water and recovered air are produced along with several valuable, life and isolated environment sustaining co-products, such as hydrogen, methane, protein, and lube oils.

DETAILED DESCRIPTION

The current invention is a Biorefinery Method and System for Isolated Environments that effectively treats all human activity-derived waste while reoxygenating used cabin air and eliminating any built-up carbon dioxide. The Biorefinery System ("BIOSYS") creates process-by-products comprising: recovered potable water, liberated free oxygen, edible protein cake (with and without lipids), soil amendments, and machinery lube oils. Additionally, the BIOSYS captures and chemically binds carbon dioxide into microbial cells and associated by-products, thereby producing recovered usable returned cabin air.

FIG. 1 depicts an exemplary embodiment of the BIOSYS. Influent for the system comprise black water (sewage), grey water (sinks, showers, etc.), and food waste. The embodiment comprises 5 Steps: anaerobic digestion, aerobic biotreatment, lipid extraction and processing, algal reactor processing, and advanced adsorption polishing.

In Step 1 anaerobic bacteria metabolically break down or decompose the chemical oxygen demand ("COD") of the influents. In one embodiment, the bacteria comprise developed bacteria and mixed consortium of wild species. In other embodiments, the bacteria species may vary, so long as the collective is capable of breaking down the COD of the influent by at least 80%. Other elements, such as ammonium, phosphate, iron, cobalt, or some combination thereof may be integrated with the bacteria as nutrients. In one or more embodiments, the bacteria are housed in a capped, fixed tank as known in the art. The amount of bacteria and size of the tank depend on the number of humans living in the isolated environment and the estimated amount of waste produced by human life activities.

By metabolizing the COD, the bacteria produce hydrogen and methane. These products may be used to, inter alia, power fuel cells used for the BIOSYS or other processes within the isolated environment. Additionally methane may be fed into the aerobic bioreactor of the next step as supplementary feedstock. The methane can then be converted into additional protein and lipids via methanotrophic conversion.

In one or more embodiments, total hydrogen, that is, no methane production is desired. The more efficient the metabolic process, the more hydrogen that will be produced and the less methane. The amount of hydrogen produced can be altered by additions of feedstock, varying the operational conditions such as retention time, pH, etc., and applying pre-treatment methods as known in the art.

In addition to the hydrogen and methane, metabolizing COD produces liquid and solid effluents. The liquid effluents comprise simple organic acids (acetic, lactic, and proprionic acids) and untreated-residual, soluble COD. The solid effluents comprise biosolids and other solids not digested by the anaerobic bacteria. The liquid and solid effluents are depicted in FIG. 1 as two separate phase streams for clarity. In practice, the liquids and solid effluents are produced as a slurry which is then used as feedstock for Step 2. Both are possible and usable within the BIOSYS.

As depicted in FIG. 1, Step 2—aerobic biotreatment—directs the simple organic acids produced in Step 1, along with the residual COD, into a second holding tank with aerobic bacteria. The simple organic acids, COD, and aerobic bacteria in the tank convert the organic fraction of the effluents into high lipid content microbial solids (bacteria cells). In later steps, the cells may be delipified to produce both a nutraceutical and lube oil or the lipified cake may be used as a protein source or as a soil fertility amendment.

In one or more embodiments any unwanted, non-lipid containing solids that remain after the aerobic biotreatment may be recycled. In this embodiment, the superfluous solids are used as additional feedstock for the anaerobic digestion of Step 1.

FIG. 2 depicts another embodiment of the BIOSYS wherein Step 2 is eliminated. This allows for a reduced energy, oxygen, and physical footprint of the system. In this embodiment, the liquid and solid effluent slurry is fed directly into Step 3, which comprises a separation process. In one embodiment, the separation process is performed using a centrifuge. In other embodiments, a settler designed to remove particulates from liquids is used. For example, a lamella clarifier or other clarifier as known in the art is used. The digested solid effluents are removed from the system while the liquid-phase and gaseous effluents are used as feedstock for Step 5. In one embodiment, the digested solids are used as a soil amendment. In one or more embodiments, any unwanted solids that are not digested and used for positive purposes, may be fed back into the anaerobic digestion Step 1 as additional feedstock.

In both the embodiment depicted in FIG. 1 (after Step 2) and the embodiment depicted in FIG. 2 (after Step 3), the liquid-phase effluents, which comprise residential COD and macronutrients and the gaseous-phase effluents, which comprise $CO_2$ (for the FIG. 1 embodiment only) and inputted cabin air are fed into a growth algal reactor. The growth algal reactor step is labeled as Step 5 in FIGS. 1 and 2 and acts simultaneously with Step 4. The growth algal reactor ("aerobic bioreactor") of Step 5 uses a tank which houses a culture of green algae within an immobilized, attached medium or "turf" matrix. Any known green algae will perform the desired function. Additionally, sunlight is provided to the reactor directly or via supplied fiber-optics.

Within the reactor, the algae remove the nutrients (nitrogen and phosphate) from the aerobic bioreactor effluents. Much of the remaining COD is polished off within the liquid-phase effluents. The algae also scrub carbon dioxide from the gaseous effluents to produce oxygen-enriched, purified cabin air. Whole cells algae are a product of this process and are used as feedstock in the lipid extraction process of Step 4 described below. In other embodiments, bacterial cells produced in the reactor is also extracted and used as feedstock. Finally, a high quality protein cake will be produced from harvesting lipids and protein (cell constituents) from algae whole cells or bacteria whole cells or a combination of algae and bacteria whole cells. The lipid can be kept in the algae cake (whole cake) or the cake may be delipified to recovery lipids. A small biomass content of heterotrophic bacteria is expected to be present in the algae bed to be used to polish any residual organics and nutrients in Step 6.

Simultaneous with Step 5 is the lipid extraction process of Step 4. In this step, the microbial solids of Step 2 along with produced whole cells from Step 5 are treated to extract lipids. In one embodiment, the extraction process is performed using carbon dioxide supercritical extraction as known in the art. In other embodiments, mechanical extraction—such as pressing—is performed, which eliminates the use of chemicals during the extraction process. In yet another embodiment, organic fluid extraction is used. Organic fluid extraction comprises lysing algae or bacterial cells with a solvent such as hexane or with alcohols and extracting lipids. In this embodiment, the solvents may be recovered and reused. In one embodiment, the lipids extracted are used as a nutraceutical amendment for humans and/or animals. In other embodiments, the lipids extracted may be used as machinery lube oil. In other embodiments, the extracted lipids are used for other useful purposes.

In one or more embodiments, any post-lipid extraction solids are recycled. These solids are fed back into the anaerobic digestion step to be used as further feedstock for the anaerobic algae.

The final Step 6 is an advanced adsorption polishing process that removes any residual chemicals, such as nitrogen compounds, metals, and inorganics, from the Step 5 growth algal reactor liquid-phase, aqueous effluents, thereby producing potable water. Step 6 is performed using an innovative functionalized mesoporous adsorbent ("FMS") bed that is thermally regenerated using electrical power. In one or more embodiments, ordered mesoporous carbon ("OMC") is used. The OMC may be prepared using synthesized COK-19, a silica host, per industry procedures.

In one or more embodiments, the FMS is modified to increase the adsorption capacity. For example, metal nanoparticles are applied onto the surface of the OMC. Additionally, the interaction between f-orbitals of Lanthanides and different functional groups can assist the formation of complexes with organic compounds. In one embodiment, Cerium(III) chloride is used to modify the FMS. In other embodiments, the FMS is doped with silver nanoparticles and iodine that act as disinfectants to remove any microbes from the liquid-phase effluents.

In one or more embodiments, a UV disinfection system is used in conjunction with the FMS. The inline, flow-through reactor system provides another layer of cleaning the water for potable use.

In one or more embodiments, the system is equipped with a failsafe mechanism. For example, an adsorption system comprising a column packed with an adsorption capable of adsorbing pollutants and other chemicals of concern may be used. In one or more embodiments, the adsorption is activated carbon; however, any synthetic materials with the capacity to adsorb pollutants and other chemicals of concern may be used. This failsafe mechanism prevents any harmful pollutants or chemicals from escaping the BIOSYS into the isolated system.

The invention claimed is:

1. An influent biorefinery method comprising the steps of:
 a. anaerobically digesting an influent to produce effluents comprising simple organic acids and residual soluble chemical oxygen demand;
 b. processing said simple organic acids and said soluble chemical oxygen demand to produce lipid and protein enriched microbial solids;
 c. extracting said lipids from at least a portion of said lipid and protein enriched microbial solids to produce at least one value-added product;
 d. reacting at least a portion of said lipid and protein enriched microbial solids to produce a second at least one value-added product and an aqueous effluent; and
 e. adsorption polishing said aqueous effluent to produce a third at least one value-added product.

2. The method of claim 1 wherein said anaerobically digesting comprises metabolically decomposing chemical oxygen demand of said influent.

3. The method of claim 1 wherein said processing comprises directing said effluents into a tank, said tank housing aerobic bacteria, wherein said aerobic bacteria convert an organic fraction of said effluents into said lipid and protein enriched microbial solids.

4. The method of claim 1 wherein said at least one value-added product comprises at least one from the group consisting of: nutraceutical oil, lube oil, lipified cake as a protein source, and soil fertility amendment.

5. The method of claim 1 wherein said second at least one value-added product comprises at least one from the group consisting of: enriched ambient air and whole algal cells.

6. The method of claim 1 wherein said adsorption polishing comprises removing any residual chemicals from said aqueous effluent using advanced adsorption polishing with a functionalized mesoporous adsorbent bed.

7. The method of claim 1 wherein said third at least one value-added product comprises potable water.

8. An influent biorefinery method comprising the steps of:
 a. anaerobically digesting said an influent to produce an effluent slurry comprising simple organic acids and residual soluble chemical oxygen demand;
 b. separating said effluent slurry into digested solids, liquid-phase effluents, and ambient air;
 c. reacting said liquid-phase effluents and said ambient air to produce at least one value-added product, whole algal cells, and an aqueous effluent;
 d. extracting lipids from at least a portion of said whole algal cells to produce at least one value-added product; and
 e. adsorption polishing said aqueous effluent to produce a third at least one value-added product.

* * * * *